(12) United States Patent
Lofting

(10) Patent No.: US 6,168,227 B1
(45) Date of Patent: Jan. 2, 2001

(54) CAMPER STAND WITH FOLDING LEGS

(76) Inventor: Edward T. Lofting, 630 NE. Bean Dr., Madras, OR (US) 97741

( * ) Notice: Under 35 U.S.C. 154(b), the term of this patent shall be extended for 0 days.

(21) Appl. No.: 09/228,984

(22) Filed: Jan. 12, 1999

(51) Int. Cl.$^7$ .................................. B60P 1/64; B60P 3/34
(52) U.S. Cl. .......................... 296/156; 296/167; 108/132; 108/62; 108/147.2
(58) Field of Search ................... 296/156, 167; 108/132, 129, 130, 147.21

(56) References Cited

U.S. PATENT DOCUMENTS

| | | | |
|---|---|---|---|
| D. 364,978 | 12/1995 | Smith | D6/431 |
| 1,013,231 | * 1/1912 | Stearns | 190/18 R |
| 1,369,943 | * 5/1921 | Springer | 108/129 |
| 1,906,865 | * 5/1933 | Knox | 108/62 |
| 2,178,248 | * 10/1939 | Bristow | 108/132 |
| 3,033,630 | * 5/1962 | Mugler | 108/129 |
| 3,409,154 | 11/1968 | Rasmussen | 414/498 |
| 3,462,123 | 8/1969 | Oliver | 254/45 |
| 3,635,366 | 1/1972 | Dodgen | 214/515 |
| 3,640,502 | 2/1972 | Bargman, Jr. | 254/45 |
| 4,314,726 | 2/1982 | Artweger et al. | 296/164 |
| 4,341,164 | * 7/1982 | Johnson | 108/67 |
| 4,723,744 | 2/1988 | Baker, Jr. et al. | 248/165 |
| 5,107,775 | * 4/1992 | Langlais et al. | 108/147.21 |
| 5,445,352 | 8/1995 | Long | 248/354.5 |
| 5,490,656 | 2/1996 | Frisby | 248/352 |
| 5,711,561 | 1/1998 | Boysen | 293/116 |

* cited by examiner

Primary Examiner—D. Glenn Dayoan
(74) Attorney, Agent, or Firm—Richard C. Litman

(57) ABSTRACT

A camper stand including a pair of elongated frame members mounted in parallel to the bottom of a camper. A pair of leg assemblies are pivotally supported intermediate the elongated frame members. Each leg assembly includes a crossbar, a pair of outer sleeves attached to the crossbar, and a pair of telescoping members with each telescoping member being positioned at least in part within a respective one of the outer sleeves. Each telescoping member has a plurality of holes, a selected one of which is engaged by a pin passing through the respective outer sleeve to fix the length of each leg. Each leg assembly is fixed in the extended position by a pair of detachable braces. The leg assemblies are folded to lie flat against the bottom of the camper to permit the camper to be mounted on the bed of a truck.

10 Claims, 4 Drawing Sheets

CAMPER STAND WITH FOLDING LEGS

BACKGROUND OF THE INVENTION

1. Field of the Invention

The present invention relates to a camper stand which can be used to support a camper, of the type carried on the bed of a pickup truck, above the ground for a relatively long duration.

2. Description of the Related Art

Campers are mobile living quarters that are generally transported on the beds of trucks. Campers are used mainly for recreational purposes and provide living quarters for people engaged in outdoor recreational activities such as camping and hunting. Campers are designed to remain on the truck bed during transportation and during use, however, campers are removable from the truck bed. At times it may be desirable to remove the camper from the truck bed, for example, when using the truck for other purposes or when putting the camper in storage.

Telescoping jacks attached to each corner of the camper are commonly used to lift the camper off of or to lower the camper onto the truck bed. These telescoping jacks are designed to temporarily support the camper at a certain height above the height of the truck bed while the camper is being mounted onto or dismounted from the truck bed. These telescoping jacks are not sturdy enough to support the weight of the camper for long periods of time or to allow the camper to be used while not mounted to the bed of a truck. Further, campers generally have uneven bottoms and cannot be placed directly on the ground without some supporting base.

In the past, camper owners have resorted to stacking concrete blocks or using saw horses to support their camper while the camper is dismounted from the bed of their truck. These methods of supporting the camper require the camper owner to maintain a supply of concrete blocks or several saw horses at the site where the camper is to be stored while dismounted from the truck bed. Such measures may be practicable near one's home base, but concrete blocks or saw horses are not normally available at remote camp sites, and carrying concrete blocks or saw horses in the camper or truck at all times takes up valuable storage space.

For the aforementioned reasons, various portable camper supports have been proposed in the art. Examples of such portable camper supports appear among the references discussed below. Other references cited below are intended to illustrate the state of the art of camper supports.

U.S. Pat. No. 5,711,561, issued to Richard L. Boysen on Jan. 27, 1998, shows a bumper mounted camper stand. The camper stand of Boysen is designed to be attached to the rear bumper of the vehicle carrying the camper when the stand is not in use. The camper stand of Boysen replaces only the two front telescoping jacks and does not relieve the load on the rear telescoping jacks.

U.S. Pat. No. 5,490,656, issued to Robert M. Frisby on Feb. 13, 1996, shows a camper jack stand system composed of jack stands designed to fit the feat of the conventional telescoping camper jacks to thereby provide a larger contact surface area between the telescoping jacks and the ground. The jack stand system of Frisby does not relieve the load on the telescoping camper jacks.

U.S. Pat. No. 5,445,352, issued to Jesse L. Long on Aug. 29, 1995, shows a plurality of height-adjustable jack stands that can be used to support a camper. The jack stands of Long are not designed for convenient storage aboard the camper or the vehicle transporting the camper. Therefore, the jack stands of Long cannot be conveniently carried with the camper at all times so as to be available even at remote camp sites. Further, each of the jack stands of Long is a unit separate from the other jack stands, making the system of Long susceptible to toppling as a result of lateral loads such as those encountered in a high wind.

U.S. Pat. No. 4,723,744, issued to James D. Baker, Jr. et al. on Feb. 9, 1988, shows a camper stand in the form of a rectangular frame having four legs. The camper stand of Baker, Jr. et al. is capable of quick disassembly into four elongated frame members. The camper stand of Baker, Jr. et al. does not have folding legs and is not designed for permanent attachment to the camper.

U.S. Pat. No. 4,314,726, issued to Wolfgang Artweger et al. on Feb. 9, 1982, shows telescoping jacks for lifting a camper from a vehicle. The distance between the front jacks of Artweger et al. can be adjusted so as to allow the feet of the front jacks to be positioned wider apart, thus giving greater stability to the camper while it is dismounted from the truck.

U.S. Pat. No. 3,640,502, issued to Dale L. Bargman, Jr. on Feb. 8, 1972, shows a cross-drive for simultaneously raising or lowering a pair of the telescoping camper jacks. Bargman, Jr. does not relate to a device for supporting a camper above the ground on a long term basis.

U.S. Pat. No. 3,635,366, issued to John N. Dodgen on Jan. 18, 1972, shows a combined jack and tiedown system for a camper. A crossbar extends between the feet of each pair of jacks. The crossbar passes underneath the bed of the truck. When the jacks are fully raised, the truck bed is gripped between the crossbar and the camper thus holding the camper on the truck bed.

U.S. Pat. No. 3,462,123, issued to Joseph E. Oliver on Aug. 19, 1969, shows a jacking system for use with a collapsible camper. The jacks of Oliver are fixed relative to the top portion of the camper. The feet of the jacks in Oliver are lifted off the ground by raising the entire top portion of the camper.

U.S. Pat. No. 3,409,154, issued to Reed Rasmussen on Nov. 5, 1968, shows camper support legs which are pivotally attached to the vertical sides of the portion of the camper which fits between the wheel wells. The rear legs are fixed in length and have wheels that contact the ground. The front legs are telescoping and act as jacks to raise the front of the camper bottom above the level of the truck bed. Hand cranked pinion attached to the rear of the truck bed engage racks attached to the bottom of the camper and are used to pull the camper onto the bed of the truck.

U.S. Design Pat. No. Des. 364,978, issued to Bryan W. Smith on Dec. 12, 1995, shows a height adjustable bar supported by a pair of legs. The bar has a pair of contact pads upon which the bottom of the camper can rest. The bottom of each leg is provided with a ground contacting foot in the form of a length of C-shaped cross section beam. Gussets reinforce the attachment of each leg to its respective foot.

None of the above inventions and patents, taken either singly or in combination, is seen to describe the instant invention as claimed. Specifically, none of the above inventions and patents provide a camper stand having the combination of characteristics including being permanently attachable to a camper, being capable of supporting a camper for prolonged periods of time without taking up valuable storage space within the camper or the vehicle carrying the camper, being retrofittable to existing campers, and achieving all the foregoing characteristics without subjecting the vertical walls of the camper to excessive stresses.

SUMMARY OF THE INVENTION

The present invention is directed to a camper stand with folding legs which can be used to support a camper of the type carried on the bed of a pickup truck or other vehicle. The camper stand includes a pair of elongated frame members mounted in parallel to the bottom of a camper. A pair of leg assemblies are pivotally supported intermediate the elongated frame members. Each leg assembly includes a crossbar, a pair of outer sleeves attached to the crossbar, and a pair of telescoping members with each telescoping member being positioned at least in part within a respective one of the outer sleeves. Each telescoping member has a plurality of holes, a selected one of which is engaged by a pin passing through the respective outer sleeve to fix the length of each leg at the desired length. Each leg assembly is fixed in the unfolded or extended position by a pair of detachable braces. The leg assemblies are folded to lie flat against the bottom of the camper to permit the camper to be mounted on the bed of a truck.

Accordingly, it is a principal object of the invention to provide a support for a camper that can support a camper above the ground on a long term basis.

It is another object of the invention to provide a camper stand that does not encroach on valuable storage space in the camper or in the vehicle carrying the camper, while the camper stand is being carried with the camper.

It is a further object of the invention to provide a camper stand that can be fixed to the camper and will not have to be removed in order to mount the camper on the bed of a truck.

Still another object of the invention is to provide a camper stand that can support the camper above the ground without threatening the structural integrity of the camper.

Yet another object of the invention is to provide a camper stand with legs that fold up out of the way when the camper is to be mounted on the bed of a truck and that will unfold to extend downward in order to support the camper at a desired height above the ground.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
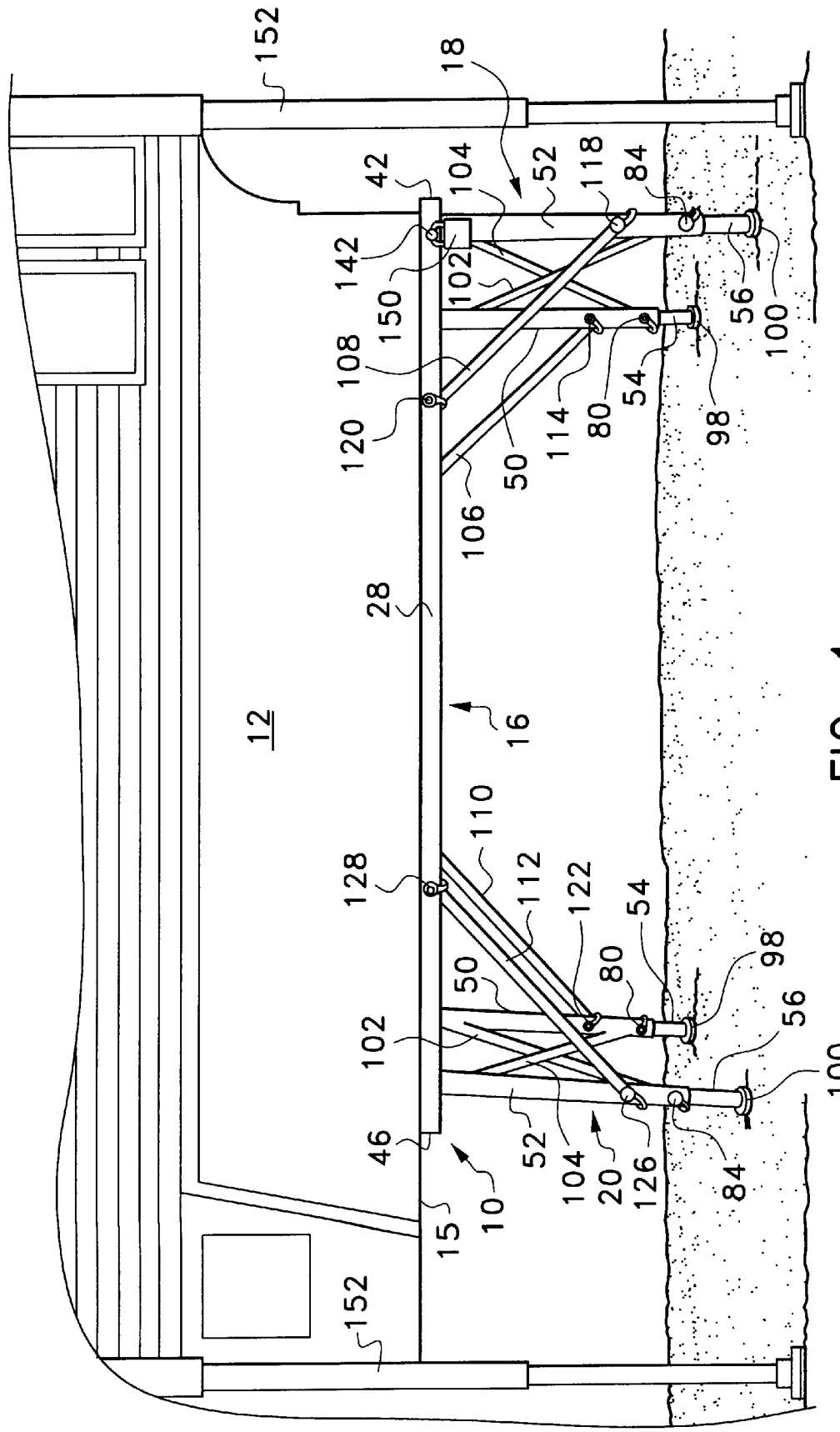
FIG. 1 is an environmental view showing the camper stand according to the present invention attached to the bottom of a camper.

Referring to FIGS. 1–5, the present invention is a camper stand 10 for supporting a camper 12 above the ground when the camper is not mounted on a vehicle. The camper stand 10 includes a left elongated frame member 14, a right elongated frame member 16, a front leg assembly 18, and a rear leg assembly 20 as its main components. The right elongated frame member 16 and the left elongated frame member 14 are designed to be fixed to the exterior surface of the bottom 15 of the camper 12 by means of a plurality of lag screws 22. Once attached, the elongated frame members 14 and 16 are designed to be left in place on a long term basis.

Each of the elongated frame members 14 and 16 is made of tubular steel having a substantially rectangular cross section. Each of the elongated frame members 14 and 16 has a top wall 24, a left wall 26, a right wall 28, and a bottom wall 30. A plurality of holes 32 are formed in the top wall 24 of each of the elongated frame members 14 and 16. The holes 32 are dimensioned to provide clearance for the shafts 34 of the lag screws 22 but are too small to allow the heads 36 of the lag screws 22 to pass therethrough. Each hole 32 in the top walls 24 of the elongated frame members 14 and 16 is in registry with a corresponding hole 38 formed in the bottom walls 30 of the elongated frame members 14 and 16. The holes 38 in the bottom walls 30 of the elongated frame members 14 and 16 are dimensioned to allow the heads 36 of the lag screws 22 to pass therethrough. The holes 38 in the bottom walls 30 of the elongated frame members 14 and 16 allow access to the holes 32 in the top walls 24 of the elongated frame members 14 and 16 for the purpose of installing the lag screws 22. Holes are drilled in the bottom 15 of the camper 12 corresponding to each of the holes 32 in the top walls 24 of the elongated frame members 14 and 16. Each lag screw 22 is first inserted through its respective hole 38 in the bottom wall 30 of each of the elongated frame members 14 and 16. The shaft 34 of each lag screw 22 is then passed through its respective hole 32 in the top of wall 24 of each of the elongated frame members 14 and 16 and threadedly engaged to the holes in the bottom 15 of the camper 12. The lag screws 22 are then tightened to fix the elongated frame members 14 and 16 to the bottom 15 of the camper 12. The top walls 24 of the elongated frame members 14 and 16 are gripped between the heads 36. of the lag screws 22 and the bottom 15 of the camper 12, thus holding the elongated frame members 14 and 16 flat against the bottom 15 of the camper 12.

The elongated frame members 14 and 16 are positioned on the bottom 15 of the camper 12 such that the elongated frame members 14 and 16 are parallel to one another and extend from the front of the camper bottom 15 toward the rear of the camper bottom 15. Also, the elongated frame members 14 and 16 are positioned such that the front ends, 40 and 42 respectively, of the elongated frame members 14 and 16 are in the same plane. Further, the rear ends 44 and 46, respectively, of the elongated frame members 14 and 16 will also be in the same plane.

Figure 5:
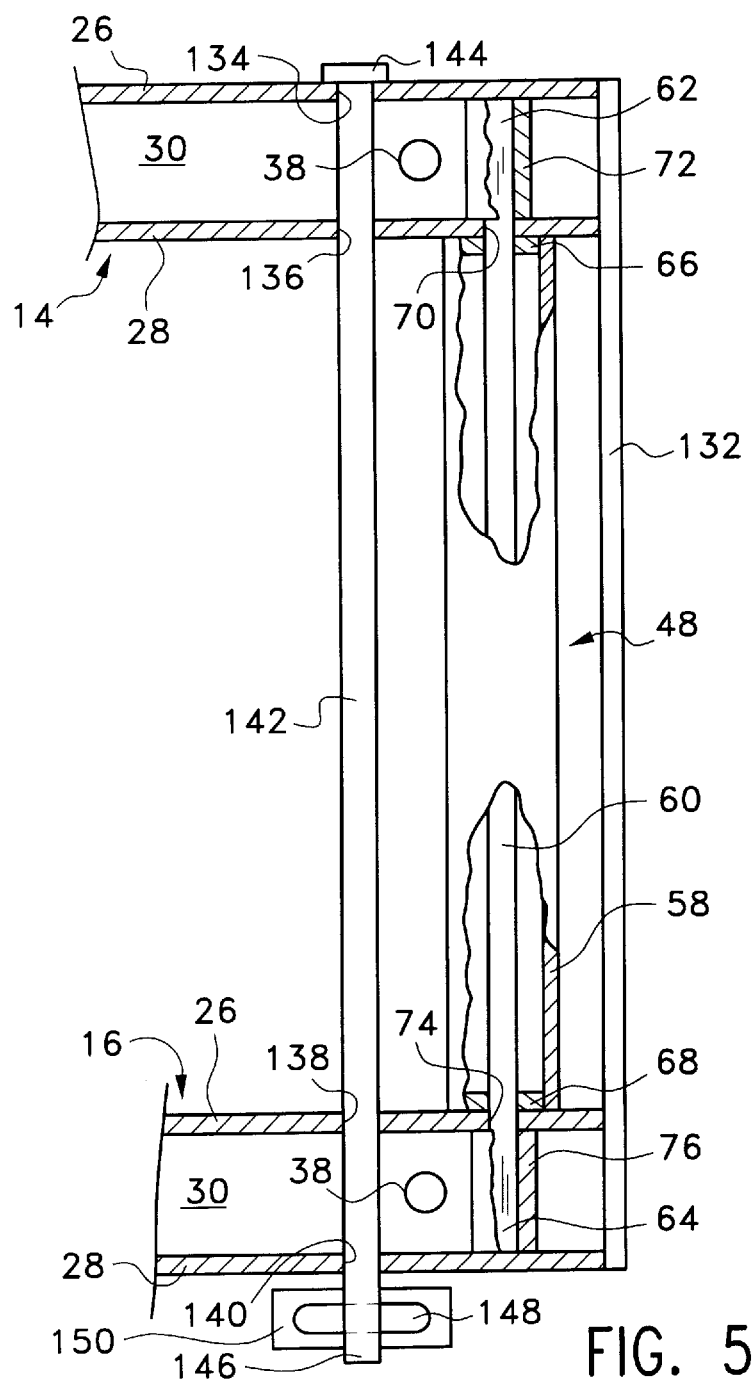
FIG. 5 is a fragmentary view showing details of the pivotal attachment of the leg assemblies and of the anti-theft device of the camper stand according to the present invention.

The front and rear leg assemblies 18 and 20 each include a crossbar 48, a left outer sleeve 50, a right outer sleeve 52, a left telescoping member 54, and a right telescoping member 56. FIG. 5 shows the construction of the front and rear crossbars 48. Each crossbar 48 is made of a tubular shell 58 of substantially circular cross section. Coaxial with each tubular shell 58 is a pivot shaft 60. Each pivot shaft 60 extends through the length of its respective tubular shell 58 with the ends 62 and 64 of each pivot shaft 60 symmetrically projecting beyond the ends of its respective tubular shell 58. Annular spacers 66 and 68 plug the annular gap between each tubular shell 58 and its respective pivot shaft 60 at each end of the tubular shell 58. The spacers 66 and 68 fix each pivot shaft 60 to its respective tubular shell 58, and the spacers 66 and 68 can be fixed to both the pivot shaft 60 and the tubular shell 58 in any well known manner. For example, the spacers 66 and 68 may be welded to both the pivot shaft 60 and the tubular shell 58, or the spacers 66 and 68 may be press fit between the pivot shaft 60 and the tubular shell 58.

The left elongated frame member 14 has a hole 70 in its right wall 28 which registers with the bore of a tubular sleeve 72 fixed to the interior of the left elongated frame member 14. Similarly, the right elongated frame member 16 has a hole 74 in its left wall 26 which registers with the bore of a tubular sleeve 76 fixed to the interior of the right elongated frame member 16. The tubular sleeves 72 and 76 span the distance between the left and right walls of the elongated frame members 14 and 16, respectively, and the tubular sleeves 72 and 76 are welded in place. A respective set of tubular sleeves 72 and 76 rotatably supports the ends of each of the pivot shafts 60, thus allowing each of the leg assemblies 18 and 20 to pivot freely about the longitudinal axis of its respective pivot shaft 60. Therefore, the pivot axis of each of the leg assemblies 18 and 20 is coincident with the longitudinal axis of its respective pivot shaft 60. Each end of each pivot shaft 60 is placed in a respective one of the tubular sleeves 72 and 76 before the elongated frame members 14 and 16 are fixed to the bottom of the camper 12.

The left outer sleeve 50 of each of the leg assemblies 18 and 20 is tubular and has an open distal end located distally from its respective crossbar 48. Further, each left outer sleeve 50 has a closed proximal end at which each left outer sleeve 50 is joined, by welding for example, to its respective crossbar 48. Each left telescoping member 54 is dimensioned to fit through the open distal end of its respective left outer sleeve 50, and at least a portion of each left telescoping member 54 is positioned within its respective left outer sleeve 50 such that one end of each left telescoping member 54 projects from the open distal end of its respective left outer sleeve 50.

The length to which each left telescoping member 54 projects from its respective left outer sleeve 50 can be varied by slidably moving the left telescoping member 54 relative to its respective left outer sleeve 50. Each left telescoping member 54 has a plurality of through holes 78 distributed along its length. Each left outer sleeve 50 has a pair of holes proximate its open distal end. The pair of holes proximate the open distal end of each left outer sleeve 50 are formed on opposite sides of the wall of the outer sleeve 50 along the same diameter of the outer sleeve 50. Also, the pair of holes proximate the open distal end of each left outer sleeve 50 are concentric with one another and are of the same size. As each left telescoping member is slidably moved relative to its respective left outer sleeve 50 a different one of the plurality of the through holes 78 comes into alignment with the pair of holes proximate the open distal end of its respective left outer sleeve 50. A pin 80 passing through the pair of holes proximate the open distal end of the left outer sleeve 50 and a selected one of the plurality of through holes 78 along the length of the respective left telescoping member 54, is used to fix at a desired value the length to which each left telescoping member 54 projects from its respective left outer sleeve 50.

Similarly, the right outer sleeve 52 of each of the leg assemblies 18 and 20 is tubular and has an open distal end located distally from its respective crossbar 48. Further, each right outer sleeve 52 has a closed proximal end at which each right outer sleeve 52 is joined, by welding for example, to its respective crossbar 48. Each right telescoping member 56 is dimensioned to fit through the open distal end of its respective right outer sleeve 52, and at least a portion of each right telescoping member 56 is positioned within its respective right outer sleeve 52 such that one end of each right telescoping member 56 projects from the open distal end of its respective right outer sleeve 52.

The length to which each right telescoping member 56 projects from its respective right outer sleeve 52 can be varied by slidably moving the right telescoping member 56 relative to its respective right outer sleeve 52. Each right telescoping member has a plurality of through holes 82 distributed along its length. Each right outer sleeve 52 has a pair of holes proximate its open distal end. The pair of holes proximate the open distal end of each right outer sleeve 52 are formed on opposite sides of the wall of the outer sleeve 52 along the same diameter of the outer sleeve 52. Also, the pair of holes proximate the open distal end of each right outer sleeve 52 are concentric with one another and are of the same size. As each right telescoping member 56 is slidably moved relative to its respective right outer sleeve 52 a different one of the plurality of through holes 82 comes into alignment with the pair of holes proximate the open distal end of its respective right outer sleeve 52. A pin 84 passing through the pair of holes proximate the open distal end of the right outer sleeve 52 and a selected one of the plurality of through holes 82 along the length of the respective right telescoping member 56, is used to fix at a desired value the length to which each right telescoping member 56 projects from its respective right outer sleeve 52.

The pins 80 and 84 used for fixing the mount of projection of the telescoping members 54 and 56 are preferably of a type having a safety feature for retaining the pins in place. An example of this type of pin is shown in the inset in FIG. 2. In the illustrated example, the pin 80 or 84 has a shaft 86 and a head 88. A loop of heavy gauge resilient wire 90 is pivotally attached to the head 88 of the pin. The loop of wire 90 is bent into a roughly U-shaped profile and the end of the loop distal from the pin head 88 is formed into an eye 92 through which the shaft 86 of the pin can fit. Once the pin is placed through the outer sleeve 52, for example, the arms 94 and 96 of the U-shaped wire loop 90 are spread apart to allow the eye 92 to be placed around the portion of the shaft 86 of the pin which projects from the outer sleeve opposite the pin head 88. The resilience of the wire loop 90 will maintain the eye 92 in place around the shaft 86 of the pin unless considerable force is used to pry the arms 94 and 96 of the U-shaped wire loop apart, and thus the wire loop 90 prevents the pin from accidentally coming out of the holes in the telescoping member 54 or 56 and its respective outer sleeve 50 or 52. The type of pin just described is well known. U.S. Design Pat. No. Des. 364,978, incorporated herein by reference, illustrates another type of pin suitable for use with the present invention. In addition, a threaded bolt and nut may also be used in place of the pins 80 and 84.

The ends of the telescoping members 54 and 56, projecting from the outer sleeves 50 and 52, are provided with foot plates or pads 98 and 100, respectively, to reduce the tendency of the telescoping members 54 and 56 to sink into the ground. Each telescoping member 54 and 56 and its respective outer sleeve 50 and 52 form a leg of the camper stand 10 of the present invention.

Each leg assembly 18 and 20 has a pair of cross braces 102 and 104. Each cross brace 102 and 104 is made of steel rod stock and is welded at both ends. Each cross brace 102 extends from proximate an open distal end of a respective right outer sleeve 52 to proximate the joint between a respective crossbar 48 and the respective left outer sleeve 50. Each cross brace 102 may be welded to either the respective crossbar 48 or the respective left outer sleeve 50. Each cross brace 104 extends from proximate an open distal end of a respective left outer sleeve 50 to proximate the joint between a respective crossbar 48 and the respective right outer sleeve 52. Each cross brace 104 may be welded to either the respective crossbar 48 or the respective right outer sleeve 52.

Figure 2:
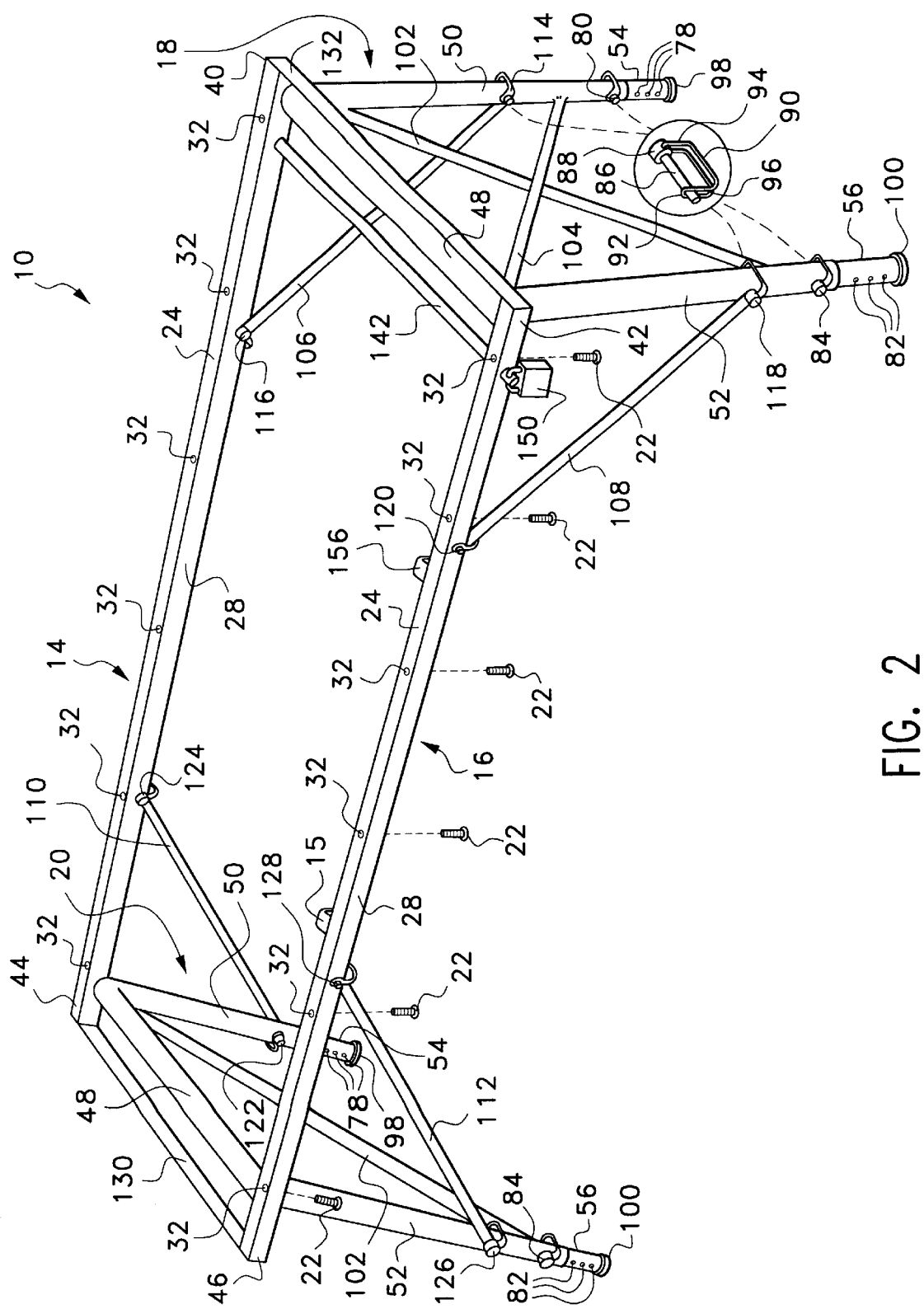
FIG. 2 is a perspective view of the camper stand according to the present invention showing the legs in the extended position.
Figure 3:
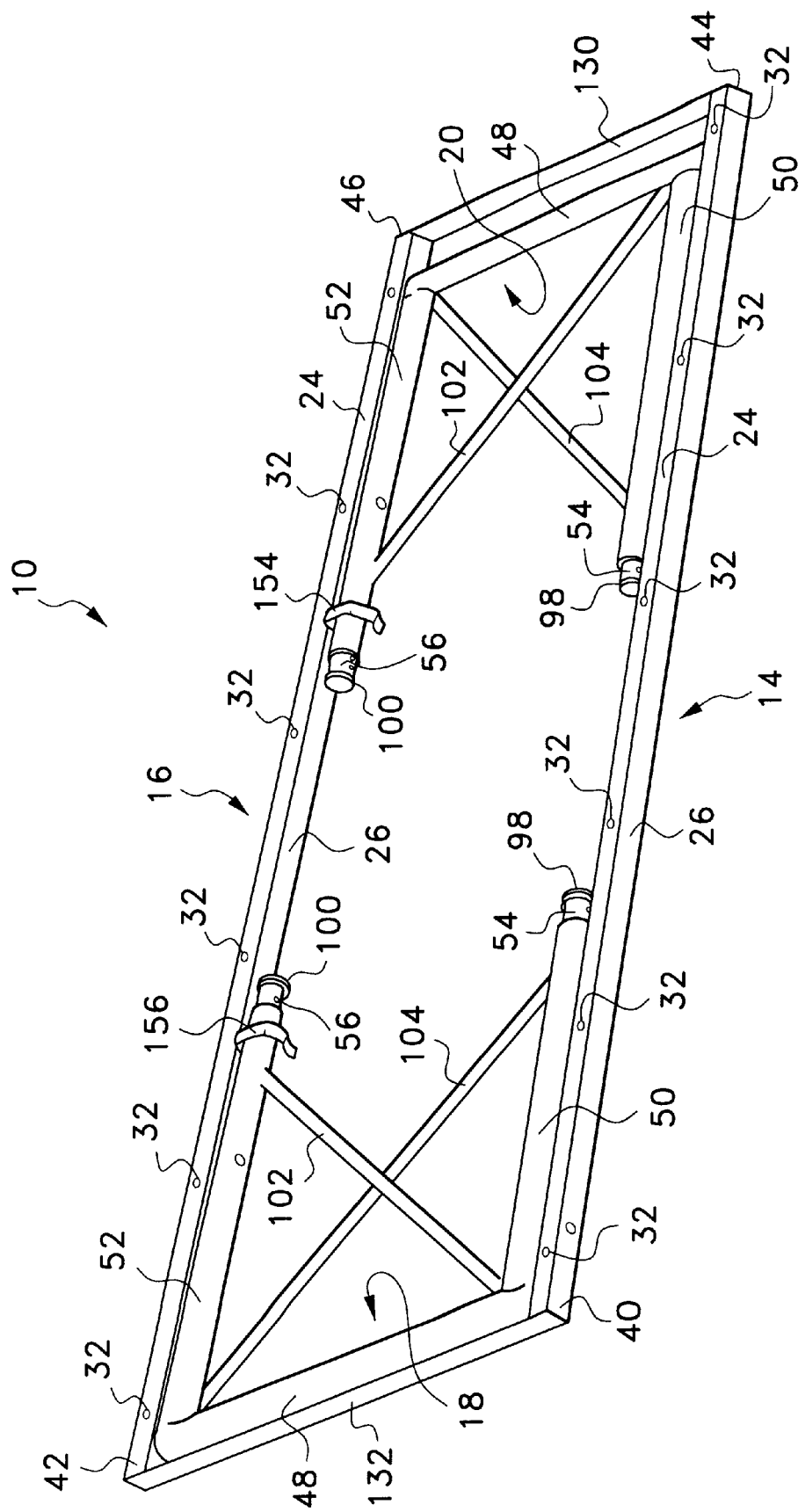
FIG. 3 is a perspective view of the camper stand according to the present invention showing the legs in the folded position.
Figure 4:
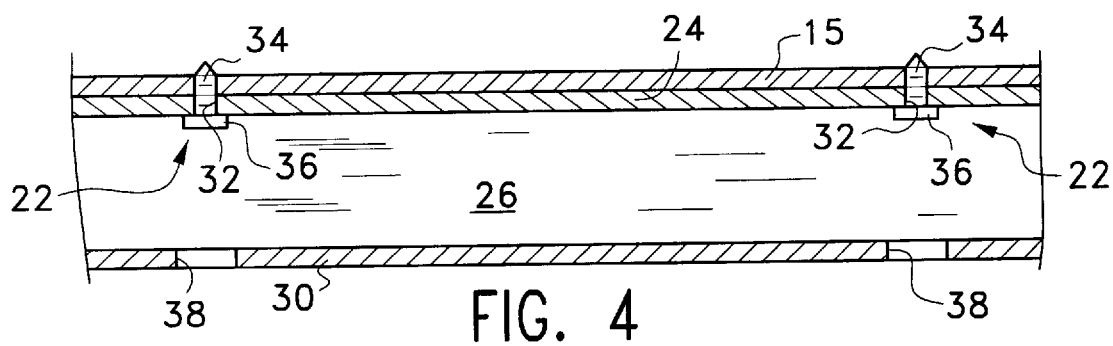
FIG. 4 is a fragmentary view showing details of the attachment of the camper stand according to the present invention to the bottom of a camper.

A front left brace 106 extending between the front left outer sleeve 50 and the left elongated frame member 14, and a front right brace 108 extending between the front right outer sleeve 52 and the right elongated frame member 16 lock the front leg assembly 18 in the unfolded position illustrated in FIGS. 1 and 2.

Similarly, a rear left brace 110 extending between the rear left outer sleeve 50 and the left elongated frame member 14, and a rear right brace 112 extending between the rear right outer sleeve 52 and the right elongated frame member 16 lock the rear leg assembly 20 in the unfolded position illustrated in FIGS. 1 and 2. The braces 106, 108, 110, and 112 are made of steel bar stock and have a hole near each of their ends.

The first end of the front left brace 106 is releasably attached to the front left outer sleeve 50 by a pin 114, when the front leg assembly 18 is locked in the unfolded position. The pin 114 passes through the hole near the first end of the front left brace 106 and through a pair of holes located intermediate the distal and proximal ends of the front left outer sleeve 50. The pair of holes in the front left outer sleeve 50 through which the pin 114 passes are farther from the distal end of the left front outer sleeve 50 as compared to the pair of holes through which the respective pin 80 passes. The pair of holes in the front left outer sleeve 50 through which the pin 114 passes should be far enough away from the open distal end of the left front outer sleeve 50 so as not to interfere with the left front telescoping member 54 when the left front telescoping member 54 is in the fully retracted position. The pair of holes in the front left outer sleeve 50 through which the pin 114 passes are formed on opposite sides of the wall of the front left outer sleeve 50 along the same radius of the front left outer sleeve. Further, the pair of holes through which the pin 114 passes are concentric with one another and are of the same size.

The second end of the front left brace 106 is releasably attached to the left elongated frame member 14 by a pin 116 when the front leg assembly 18 is locked in the unfolded position. The pin 116 passes through the hole at the second end of the front left brace 106 and a pair of holes formed in the left elongated frame member 14 intermediate the pivot axis of the front leg assembly 18 and the pivot axis of the rear leg assembly 20. One of the pair of holes in the left elongated frame member 14 through which pin 116 passes is formed in the left wall 26 of the left elongated frame member 14, while the other one of the pair of holes is formed in the right wall 28 of the left elongated frame member 14. Each of the pair of holes through which pin 116 passes is concentric with and of the same size as the other one of the pair of holes.

The first end of the front right brace 108 is releasably attached to the front right outer sleeve 52 by a pin 118, when the front leg assembly 18 is locked in the unfolded position. The pin 118 passes through the hole near the first end of the front right brace 108 and through a pair of holes located intermediate the distal and proximal ends of the front right outer sleeve 52. The pair of holes in the front right outer sleeve 52 through which the pin 118 passes are farther from the distal end of the right front outer sleeve 52 as compared to the pair of holes through which the respective pin 84 passes. The pair of holes in the front right outer sleeve 52 through which the pin 118 passes should be far enough away from the open distal end of the right front outer sleeve 52 so as not to interfere with the right front telescoping member 56 when the right front telescoping member 56 is in the fully retracted position. The pair of holes in the front right outer sleeve 52 through which the pin 118 passes are formed on opposite sides of the wall of the front right outer sleeve 52 along the same radius of the front right outer sleeve 52. Further, the pair of holes through which the pin 118 passes are concentric with one another and are of the same size.

The second end of the front right brace 108 is releasably attached to the right elongated frame member 16 by a pin 120 when the front leg assembly 18 is locked in the unfolded position. The pin 120 passes through the hole at the second end of the front right brace 108 and a pair of holes formed in the right elongated frame member 16 intermediate the pivot axis of the front leg assembly 18 and the pivot axis of the rear leg assembly 20. One of the pair of holes in the right elongated frame member 16 through which pin 120 passes is formed in the right wall 28 of the right elongated frame member 16, while the other one of the pair of holes is formed in the left wall 26 of the right elongated frame member 16. Each of the pair of holes through which the pin 120 passes is concentric with and of the same size as the other one of the pair of holes.

The first end of the rear left brace 110 is releasably attached to the rear left outer sleeve 50 by a pin 122, when the rear leg assembly 20 is locked in the unfolded position. The pin 122 passes through the hole near the first end of the rear left brace 110 and through a pair of holes located intermediate the distal and proximal ends of the rear left outer sleeve 50. The pair of holes in the rear left outer sleeve 50 through which the pin 122 passes are farther from the distal end of the left rear outer sleeve 50 as compared to the pair of holes through which the respective pin 80 passes. The pair of holes in the rear left outer sleeve 50 through which the pin 122 passes should be far enough away from the open distal end of the left rear outer sleeve 50 so as not to interfere with the rear left telescoping member 54 when the left rear telescoping member 54 is in the fully retracted position. The pair of holes in the rear left outer sleeve 50 through which the pin 122 passes are formed on opposite sides of the wall of the rear left outer sleeve 50 along the same radius of the rear left outer sleeve 50. Further, the pair of holes through which the pin 122 passes are concentric with one another and are of the same size.

The second end of the rear left brace 110 is releasably attached to the left elongated frame member 14 by a pin 124 when the rear leg assembly 20 is locked in the unfolded position. The pin 124 passes through the hole at the second end of the rear left brace 110 and a pair of holes formed in the left elongated frame member 14 intermediate the pivot axis of the rear leg assembly 20 and the pair of holes in the left elongated frame member 14 through which the pin 116 passes. One of the pair of holes in the left elongated frame member 14 through which pin 124 passes is formed in the left wall 26 of the left elongated frame member 14, while the other one of the pair of holes is formed in the right wall 28 of the left elongated frame member 14. Each one of the pair of holes through which the pin 124 passes is concentric with and of the same size as the other one of the pair of holes.

The first end of the rear right brace 112 is releasably attached to the rear right outer sleeve 52 by a pin 126, when the rear leg assembly 20 is locked in the unfolded position. The pin 126 passes through the hole near the first end of the rear right brace 112 and through a pair of holes located intermediate the distal and proximal ends of the rear right outer sleeve 52. The pair of holes in the rear right outer sleeve 52 through which the pin 126 passes are farther from the distal end of the right rear outer sleeve 52 as compared to the pair of holes through which the respective pin 84 passes. The pair of holes in the rear right outer sleeve 52 through which the pin 126 passes should be far enough away from the open distal end of the right rear outer sleeve 52 so as not to interfere with the right rear telescoping member 56 when the right rear telescoping member 56 is in the fully retracted position. The pair of holes in the rear right outer sleeve 52 through which the pin 126 passes are formed on opposite sides of the wall of the rear right outer sleeve 52 along the same radius of the rear right outer sleeve 52. Further, the pair of holes through which the pin 126 passes are concentric with one another and are of the same size.

The second end of the rear right brace 112 is releasably attached to the right elongated frame member 16 by a pin 128 when the rear leg assembly 20 is locked in the unfolded position. The pin 128 passes through the hole at the second end of the rear right brace 112 and a pair of holes formed in the right elongated frame member 16 intermediate the pivot axis of the rear leg assembly 20 and the pair of holes in the right elongated frame member 16 through which the pin 120 passes. One of the pair of holes in the right elongated frame member 16 through which pin 128 passes is formed in the right wall 28 of the right elongated frame member 16, while the other one of the pair of holes is formed in the left wall 26 of the right elongated frame member 16. Each one of the pair of holes through which the pin 128 passes is concentric with and of the same size as the other one of the pair of holes.

The pins 114, 116, 118, 120, 122, 124, 126, and 128 are of the same types as was discussed in reference to the pins 80 and 84. The pins 114, 116, 118, 120, 122, 124, 126, and 128 are removed to allow the braces 106, 108, 110, and 112 to be removed and in turn to allow the front and rear leg assemblies 18 and 20 to be moved to the folded position shown in FIG. 3 to thereby allow the camper 12 to be mounted on the bed of a truck.

An elongated face plate 130 is welded over the open rear ends of the elongated frame members 14 and 16. Also, an elongated face plate 132 is welded over the open front ends of the elongated frame members 14 and 16. The face plates 130 and 132 are welded to the elongated frame members 14 and 16 after the projecting ends of each pivot shaft 60 are inserted in their respective tubular sleeves 72 and 76. The face plates 130 and 132 give added rigidity to the camper stand 10 and facilitate the attachment of the camper stand 10 to the bottom of the camper 12 by holding the camper stand 10 together prior to and during the installation of the camper stand on the bottom of the camper 12.

The camper stand 10 further includes a theft deterrent device. The theft deterrent device includes four concentric and same sized holes 134, 136, 138, and 140 formed in the elongated frame members 14 and 16 in close proximity to the crossbar 48 of the front leg assembly 18. A long rod 142 extends through all four holes 134, 136, 138, and 140. The rod 142 has a large diameter head 144 at one end which will not fit through the holes 134, 136, 138, and 140. Thus the rod 142 can only be removed from the elongated frame members 14 and 16 by pulling the end 146 of the rod 142, opposite the end having the head 144, through the four holes 134, 136, 138, and 140. The end 146 of the rod 142, opposite the end having the head 144, has a transverse through bore which allows the hook 148 of a padlock 150 to be engaged to the end 146 of the rod 142 opposite the end having the head 144. Thus when the rod 142 is placed through the holes 134, 136, 138, and 140 and the padlock 150 is engaged to the end 146 having the through bore, the rod 142 cannot be easily removed from the camper stand 10 without the key to the padlock 150. With the rod 142 placed through the holes 134, 136, 138, and 140 the front leg assembly 18 cannot be completely folded, thus preventing the camper 12 from being mounted on the bed of a truck. This arrangement makes it more difficult for a person who does not possess the key to the padlock 150 to spirit the camper 12 away using a truck or other vehicle.

With the camper stand 10 fixed to the bottom of the camper 12, the conventional telescoping jacks 152 are used to raise the legs of the camper stand 10 off the ground. The telescoping members 54 and 56 are then moved to their fully retracted positions and held there by the pins 80 and 84. By proper positioning of the joints between the outer sleeves 50 and 52 and the crossbars 48, there will be enough clearance between the outer sleeves 50 and 52 and the elongated frame members 14 and 16 such that the pins 80 and 84 will not interfere with the folding of the front and rear leg assemblies 18 and 20. Then the pins 114, 116, 118, 120, 122, 124, 126, and 128 and the braces 106, 108, 110, and 112 are removed and the leg assemblies 18 and 20 moved to the folded position. Spring clips 154 and 156, attached to the left wall 26 of the right elongated frame member 16, catch the leg assemblies 18 and 20 and hold them in the folded position. A truck can then be backed toward the camper 12 to place the bed of the truck under the bottom of the camper 12. The telescoping jacks 152 are then retracted to lower the camper 12 onto the bed of the truck and the camper is then secured to the bed of the truck in the conventional way. The camper stand 10 is dimensioned such that the presence of the camper stand 10 will not interfere with the securing of the camper 12 to the truck bed.

To dismount the camper 12 from the truck, the conventional means securing the camper to the truck bed are disengaged and the telescoping jacks 152 used to raise the camper 12 above the truck bed. The truck is then driven out from under the camper 12 and the leg assemblies 18 and 20 are moved to the unfolded position. The pins 114, 116, 118, 120, 122, 124, 126, and 128 and the braces 106, 108, 110, and 112 are then used to lock the leg assemblies 18 and 20 in the unfolded position. The amount of projection of each of the telescoping members 54 and 56 from its respective outer sleeve 50 and 52 is then adjusted to ensure that the camper 12 will be level, and then the telescoping jacks 152 are retracted to transfer the weight of the camper 12 to the camper stand 10.

It is to be understood that the present invention is not limited to the embodiment described above, but encompasses any and all embodiments within the scope of the following claims.

I claim:

1. A camper stand for supporting a camper above a surface when the camper is not mounted on a vehicle, the camper having a bottom with an exterior surface, the camper stand comprising:

a left elongated frame member;

a right elongated frame member, said left and right elongated frame members being dimensioned and configured to be attachable in parallel to the bottom of the camper;

a front leg assembly including:
  a front crossbar,
  a front left outer sleeve fixedly attached to the front crossbar,
  a front right outer sleeve fixedly attached to the front crossbar,
  a front left telescoping member positioned at least in part within said front left outer sleeve, and
  a front right telescoping member positioned at least in part within said front right outer sleeve,
  said front leg assembly being pivotally supported intermediate said left and right elongated frame members, said front leg assembly being pivotable between a first folded position and a first unfolded position;
a rear leg assembly including:
  a rear crossbar,
  a rear left outer sleeve fixedly attached to the rear crossbar,
  a rear right outer sleeve fixedly attached to the rear crossbar,
  a rear left telescoping member positioned at least in part within said rear left outer sleeve, and
  a rear right telescoping member positioned at least in part said rear right outer sleeve,
  said rear leg assembly being pivotally supported intermediate said left and right elongated frame members, said rear leg assembly being pivotable between a second folded position and a second unfolded position;
a front left brace having a first end and a second end;
a front right brace having a first end and a second end, said first end of said front left brace being releasably attached to said front left outer sleeve, said second end of said front left brace being releasably attached to said left elongated frame member, said first end of said front right brace being releasably attached to said front right outer sleeve, and said second end of said front right brace being releasably attached to said right elongated frame member, when said front leg assembly is locked in said first unfolded position;
said left elongated frame member having a first pair of holes proximate said front crossbar, and said right elongated frame member having a second pair of holes proximate said front crossbar, said first pair of holes and said second pair of holes all being in alignment;
a rear left brace having a first end and a second end;
a rear right brace having a first end and a second end, said first end of said rear left brace being releasably attached to said rear left outer sleeve, said second end of said rear left brace being releasably attached to said left elongated frame member, said first end of said rear right brace being releasably attached to said rear right outer sleeve, and said second end of said rear right brace being releasably attached to said right elongated frame member, when said rear leg assembly is locked in said second unfolded position;
a theft deterrent rod having a head that is too large to pass through any of said first pair of holes and said second pair of holes at a first end thereof and a through bore at a second end thereof, said theft deterrent rod being dimensioned to at least extend completely through all of said first pair of holes and said second pair of holes with said second end thereof projecting from a side of the camper stand opposite a side of the camper stand adjacent said head of said theft deterrent rod; and
a padlock engageable with said through bore of said theft deterrent rod, whereby said theft deterrent rod prevents said front leg assembly from moving into said first folded position when said theft deterrent rod is positioned to extend through said first pair of holes and said second pair of holes and whereby said padlock impedes unauthorized removal of said theft deterrent rod when engaged to said through bore of said theft deterrent rod.

2. The camper stand according to claim 1, further comprising:
  a first plurality of screws for fastening said left elongated frame member to the bottom of the camper when the camper stand is attached to the camper; and
  a second plurality of screws for fastening said right elongated frame member to the bottom of the camper when the camper stand is attached to the camper.

3. The camper stand according to claim 2, wherein said left and right elongated frame members are tubular and have substantially rectangular cross sections, each of said left and right elongated frame members has a top wall which abuttingly contacts the exterior surface of the bottom of the camper when the camper stand is attached to the camper, and each of said left and right elongated frame members has a bottom wall opposite said top wall thereof.

4. The camper stand according to claim 3, wherein each of said first plurality of screws has a threaded shaft and a head, said top wall of said left elongated frame member has a first plurality of holes and said bottom wall of said left elongated frame member has a second plurality of holes, each of said second plurality of holes being in registry with a respective one of said first plurality of holes, each of said first plurality of holes being dimensioned to provide clearance for said threaded shaft of a respective one of said first plurality of screws while being too small for said head of said respective one of said first plurality of screws to pass therethrough, each of said second plurality of holes being sized to allow the passage of said head of a respective one of said first plurality of screws therethrough to thereby allow said shaft of said respective one of said first plurality of screws to be positioned through a respective one of said first plurality of holes with said head of said respective one of said first plurality of screws abutting said top wall of said left elongated frame member, and
  wherein each of said second plurality of screws has a threaded shaft and a head, said top wall of said right elongated frame member has a third plurality of holes and said bottom wall of said right elongated frame member has a fourth plurality of holes, each of said fourth plurality of holes being in registry with a respective one of said third plurality of holes, each of said third plurality of holes being dimensioned to provide clearance for said threaded shaft of a respective one of said second plurality of screws while being too small for said head of said respective one of said second plurality of screws to pass therethrough, each of said fourth plurality of holes being sized to allow the passage of said head of a respective one of said second plurality of screws therethrough to thereby allow said shaft of said respective one of said second plurality of screws to be positioned through a respective one of said third plurality of holes with said head of said respective one of said second plurality of screws abutting said top wall of said right elongated frame member.

5. The camper stand according to claim 1, wherein said front left brace has, a hole proximate said first end thereof and a hole proximate said second end thereof, said front right brace has a hole proximate said first end thereof and a hole proximate said second end thereof, said rear left brace has a hole proximate said first end thereof and a hole proximate said second end thereof, said rear right brace has a hole proximate said first end thereof and a hole proximate said second end thereof, said front left outer sleeve is tubular and has an open distal end located distally from said front crossbar and a closed proximal end at which said front left outer sleeve is joined to said front crossbar, said front left outer sleeve further having a third pair of holes located intermediate said distal end of said front left outer sleeve and said proximal end of said front left outer sleeve, said front right outer sleeve is tubular and has an open distal end located distally from said front crossbar and a closed proximal end at which said front right outer sleeve is joined to said front crossbar, said front right outer sleeve further having a fourth pair of holes located intermediate said distal end of said front right outer sleeve and said proximal end of said front right outer sleeve, said rear left outer sleeve is tubular and has an open distal end located distally from said rear crossbar and a closed proximal end at which said rear left outer sleeve is joined to said rear crossbar, said rear left outer sleeve further having a fifth pair of holes located intermediate said distal end of said rear left outer sleeve and said proximal end of said rear left outer sleeve, said rear right outer sleeve is tubular and has an open distal end located distally from said rear crossbar and a closed proximal end at which said rear right outer sleeve is joined to said rear crossbar, said rear right outer sleeve further having a sixth pair of holes located intermediate said distal end of said rear right outer sleeve and said proximal end of said rear right outer sleeve, said front leg assembly has a pivot axis and said front crossbar has a longitudinal axis which is coincident with said pivot axis of said front leg assembly, said rear leg assembly has a pivot axis and said rear crossbar has a longitudinal axis which is coincident with said pivot axis of said rear leg assembly, said left elongated frame member has a seventh pair of holes located intermediate said pivot axis of said front leg assembly and said pivot axis of said rear leg assembly, and said left elongated frame member has an eighth pair of holes located intermediate said pivot axis of said front leg assembly and said seventh pair of holes, said right elongated frame member has a ninth pair of holes located intermediate said pivot axis of said front leg assembly and said pivot axis of said rear leg assembly, and said right elongated frame member has a tenth pair of holes located intermediate said pivot axis of said front leg assembly and said ninth pair of holes, said camper stand further including:

a first pin;

a second pin;

a third pin;

a fourth pin;

a fifth pin;

a sixth pin;

a seventh pin; and an eighth pin, said first pin passing through said hole proximate said first end of said front left brace and said third pair of holes to thereby releasably attach said first end of said front left brace to said front left outer sleeve, said second pin passing through said hole proximate said second end of said front left brace and said eight pair of holes to thereby releasably attach said second end of said front left brace to said left elongated frame member, said third pin passing through said hole proximate said first end of said front right brace and said fourth pair of holes to thereby releasably attach said first end of said front right brace to said front right outer sleeve, and said fourth pin passing through said hole proximate said second end of said front right brace and said eighth pair of holes to thereby releasably attach said second end of said front right brace to said right elongated frame member, when said front leg assembly is locked in said first unfolded position, and said fifth pin passing through said hole proximate said first end of said rear left brace and said fifth pair of holes to thereby releasably attach said first end of said rear left brace to said rear left outer sleeve, said sixth pin passing through said hole proximate said second end of said rear left brace and said seventh pair of holes to thereby releasably attach said second end of said rear left brace to said left elongated frame member, said seventh pin passing through said hole proximate said first end of said rear right brace and said sixth pair of holes to thereby releasably attach said first end of said rear right brace to said rear right outer sleeve, and said eighth pin passing through said hole proximate said second end of said rear right brace and said ninth pair of holes to thereby releasably attach said second end of said rear right brace to said right elongated frame member, when said rear leg assembly is locked in said second unfolded position.

6. The camper stand according to claim 5, further comprising:

a first cross brace having a first end and a second end, said first end of said first cross brace being attached to said front right outer sleeve at a position closer to said distal end of said front right outer sleeve than to said proximal end of said front right outer sleeve, said second end of said first cross brace being attached to one of said front crossbar and said front left outer sleeve at a position proximate said proximal end of said front left outer sleeve;

a second cross brace having a first end and a second end, said first end of said second cross brace being attached to said front left outer sleeve at a position closer to said distal end of said front left outer sleeve than to said proximal end of said front left outer sleeve, said second end of said second cross brace being attached to one of said front crossbar and said front right outer sleeve at a position proximate said proximal end of said front right outer sleeve;

a third cross brace having a first end and a second end, said first end of said third cross brace being attached to said rear right outer sleeve at a position closer to said distal end of said rear right outer sleeve than to said proximal end of said rear right outer sleeve, said second end of said third cross brace being attached to one of said rear crossbar and said rear left outer sleeve at a position proximate said proximal end of said rear left outer sleeve; and a fourth cross brace having a first end and a second end, said first end of said fourth cross brace being attached to said rear left outer sleeve at a position closer to said distal end of said rear left outer sleeve than to said proximal end of said rear left outer sleeve, said second end of said fourth cross brace being attached to one of said rear crossbar and said rear right outer sleeve at a position proximate said proximal end of said rear right outer sleeve.

7. The camper stand according to claim 6, wherein said front left outer sleeve has an eleventh pair of holes proximate said distal end thereof, said front right outer sleeve has a twelfth pair of holes proximate said distal end thereof, said rear left outer sleeve has a thirteenth pair of holes proximate said distal end thereof, said rear right outer sleeve has a fourteenth pair of holes proximate said distal end thereof, said front left telescoping member has a length and a first plurality of height adjustment holes distributed along said length of said front left telescoping member, said front right telescoping member has a length and a second plurality of height adjustment holes distributed along said length of said front right telescoping member, said rear left telescoping member has a length and a third plurality of height adjustment holes distributed along said length of said rear left telescoping member, said rear right telescoping member has a length and a fourth plurality of height adjustment holes distributed along said length of said rear right telescoping member, the camper stand further comprising:

a ninth pin engaging said eleventh pair of holes and a selected one of said first plurality of height adjustment holes to thereby fix a distance to which said front left telescoping member projects from said front left outer sleeve at a desired value;

a tenth pin engaging said twelfth pair of holes and a selected one of said second plurality of height adjustment holes to thereby fix a distance to which said front right telescoping member projects from said front right outer sleeve at a desired value;

an eleventh pin engaging said thirteenth pair of holes and a selected one of said third plurality of height adjustment holes to thereby fix a distance to which said rear left telescoping member projects from said rear left outer sleeve at a desired value; and a twelfth pin engaging said fourteenth pair of holes and a selected one of said fourth plurality of height adjustment holes to thereby fix a distance to which said rear right telescoping member projects from said rear right outer sleeve at a desired value.

8. The camper stand according to claim 7, wherein said front left telescoping member has a projecting end which projects out from said front left outer sleeve, said front right telescoping member has a projecting end which projects out from said front right outer sleeve, said rear left telescoping member has a projecting end which projects out from said rear left outer sleeve, said rear right telescoping member has a projecting end which projects out from said rear right outer sleeve, the camper stand further comprising:

a first foot plate provided at said projecting end of said front left telescoping member;

a second foot plate provided at said front right telescoping member;

a third foot plate provided at said rear left telescoping member; and a fourth foot plate provided at said rear right telescoping member, whereby said first, second, third, and fourth foot plates reduce the tendency of the front left, front right, rear left, and rear right telescoping members to sink into a supporting surface.

9. The camper stand according to claim 8, further comprising:

a pair of spring clips attached to one of said left and right elongated frame members, each of said pair of spring clips engaging a respective one of said front and rear leg assemblies when said front and rear leg assemblies are in said first and second folded positions respectively, to thereby retain said front and rear leg assemblies in said first and second folded positions when the camper is being mounted on and dismounted from a vehicle.

10. The camper stand according to claim 1, wherein said left elongated frame member has a front end and a rear end, and said right elongated frame member has a front end and a rear end, the camper stand further comprising:

a first face plate welded to said front end of said left elongated frame member and said front end of said right elongated frame member; and a second face plate welded to said rear end of said left elongated frame member and said rear end of said right elongated frame member.

* * * * *